United States Patent Office 3,365,299
Patented Jan. 23, 1968

3,365,299
RICE PRODUCT AND PROCESS
James Taylor Willock, Knowle, Solihull, England, assignor to General Foods Corporation, White Plains, N.Y., a corporation of Delaware
No Drawing. Filed Nov. 6, 1964, Ser. No. 409,597
11 Claims. (Cl. 99—83)

ABSTRACT OF THE DISCLOSURE

A process for preparing modified granular rice useful for preparing rice pudding comprising hydrating milled rice to a moisture content of about 18–30% by weight, blending therewith a composition containing starch and as edible mucilage comprised of an aqueous slurry of a gum or gelatinized starch and heating said coated rice to rapidly expel the moisture, thereby fissuring said rice.

This invention relates to improvements in the modification of rice in order to minimize the cooking period required for the production of a rice pudding.

In my copending patent application Ser. No. 155,797, filed Nov. 29, 1961, now U.S. Patent No. 3,164,475, and entitled, "Improved Rice Product," I have described a process for the production of a modified rice in granular form which comprises treating milled rice grains to raise the moisture content uniformly throughout the grains to 18% to 30% by weight thereof and thereafter heating the treated grains so as to secure the rapid expulsion of moisture therefrom. This treatment results in an increase in the porosity of the grains, which undergo fissure and this subsequently enables rapid penetration by an aqueous liquid, such as milk, when the grains are cooked in such a liquid. In this way rapid liberation of starch takes place with consequent thickening of the liquid and a rice pudding may, for example, be prepared more rapidly from the resulting product. During the course of the heat treatment the moisture content is reduced to below 14% by weight, preferably to 10% to 14%. Some small amount of gelatinization of the starch present in the grains may occur during the processing, but it is desirable to keep this to a minimum, otherwise, when cooked, the rice has not the desired degree of tenderness or the thickening qualities which are necessary to produce a well prepared rice pudding.

It is an object of the present invention to provide a process for the treatment of rice grains which will enable a rice product to be produced from which a rice pudding may be prepared even more rapidly than when using the product described above. This and other objects of the present invention will be apparent as the description proceeds.

In accordance with the present invention in a process for the production of a modified granular rice by treating milled rice grains to raise the moisture content uniformly throughout the grains to from about 18% to about 30% by weight thereof and thereafter heating the treated grains to effect rapid expulsion of moisture therefrom, either prior to or after raising the moisture content of the grains to from about 18% to about 30%, the grains are coated with an edible binder and with finely divided particles of an edible starch.

When the rice is first treated to raise the moisture content throughout the grains to from about 18% to about 30%, any of the procedures described in my above-mentioned prior application may be used for this purpose. The preferred procedure is, however, to soak or spray milled rice grains with water at a temperature below the gelatinization point of the starch content thereof, e.g., for about 30 minutes at about 20° C. or about 10 minutes at about 55° to about 60° C., then to remove surface moisture and, finally, to condition the grains to ensure substantially uniform distribution of moisture therethrough. Surface moisture may be removed by centrifugation. Conditioning may be effected by maintaining the thus treated rice grains in an enclosed space or in a current of air having a controlled humidity until the moisture is substantially uniformly distributed therethrough, e.g., in an enclosed space, for about 30 minutes to about 4 hours at about 20° C., or in a current of air having a relative humidity of about 80% to about 90% for about 10 minutes at about 55° C. When the rice grains are sprayed they may be simultaneously agitated in order to assist in securing substantially uniform distribution of moisture therethrough. By proceeding in this manner rice having a substantially uniformly distributed moisture content of from about 18% to about 30%, preferably from about 22% to about 28%, by weight, may be readily obtained.

The thus treated rice is next coated with a mucilage of an edible binder and, either simultaneously or subsequently, with a finely divided edible starch. The edible binder may be an edible starch mucilage, such as a water-soluble starch mucilage or a water-soluble edible dextrin, an edible water-soluble cellulose derivative mucilage such as a carboxyalkylcellulose mucilage, e.g., a carboxymethylcellulose mucilage, or an edible plant or seaweed gum mucilage, e.g., a gum tragacanth, or a suitable carragheenate or alignate mucilage. The edible binder should, in any event, be one which does not impart any characteristic flavor to the product which is being produced. The finely divided edible starch may be a rice, maize, sago or wheat starch and is used in the form of a powder.

The mucilage of edible binder may be made by gelatinizing an edible starch in water, or by forming a solution or dispersion of an edible plant gum or a seaweed gum in water. A starch mucilage may be made using from about 0.3 to about 5 parts by weight of edible starch and from about 99.5 to about 95 parts by weight of water and boiling to gelatinize substantially all the starch. For use in this form of the present process a starch mucilage produced by dissolving or dispersing 2 to 3 parts by weight of edible starch in from about 97 to about 90 parts by weight of water and then boiling is preferred. An edible plant gum or seaweed gum may be used as a solution or dispersion in water in a concentration of from about 0.5% to about 1.5% by weight.

In order to coat the rice it is preferably rotated in a drum mounted with its axis of rotation disposed at an angle with vertical. As the drum rotates and tumbles the rice the mucilage of edible binder is sprayed at a predetermined rate into the rice, the object being to secure substantially uniform coating of the rice with the mucilage. The starch powder is preferably simultaneously introduced into the interior of the drum at a predetermined rate. This procedure ensures that the surface of the individual rice grains becomes coated with edible starch almost as soon as it is wetted by the mucilage employed.

The mucilage and/or the finely divided starch may have incorporated therein any edible coloring or flavoring materials which it is desired to have present in the final product. Thus, an edible coloring material may be dissolved in the water which is used to prepare the mucilage or ground spices or a flavoring material, such as spice extract, e.g., nutmeg extract, which has been absorbed on to particles of starch or dextrose may be admixed with the starch powder prior to use.

When the rice has been coated in this manner it is ready for the final heating step.

If rice of lower moisture content is first treated with mucilage and finely divided starch it is preferred to carry out this treatment in such manner that the moisture content of the rice grains is simultaneously brought up to the desired level. In this embodiment of the process of the invention washed rice grains having a moisture content of from about 12% to about 15% by weight may be employed. The rice grains are coated with a mucilage of an edible binder in which is slurried finely divided edible starch. The edible binder may be any of those described above and may be formed into a mucilage in a similar manner. In this form of the process, however, it is preferred first to dissolve or disperse from about 0.5 part to about 1.5 parts by weight of edible binder in from about 98.5 parts to about 99.5 parts by weight of water and then to slurry in the edible starch. The rice may next be coated with the slurry in the same manner as in the previously described form of the process. Since it is desirable, however, to employ a mucilage containing a lower proportion of binder and a correspondingly higher amount of water than in the other form of the process in order to form the slurry, it is preferred that the rate of spraying of the slurry be correlated with the rate of absoption of moisture by the rice grains from the slurry: this prevents the mass becoming wet and sticky whilst at the same time ensuring substantially uniform coating of the rice grains with finely divided starch particles. The slurry may have present therein any coloring materials, e.g., caramel, or flavoring materials, e.g., nutmeg which it is desired to have present in the final product. By proceeding thus the moisture content of the rice grains is raised to the desired level.

The product is then conditioned when necessary in the same manner as in the first form of the process: the moisture thus becomes substantially uniformly distributed throughout the rice grains. By proceeding in this manner the water content usually rises to from about 22% to about 30% by weight and is preferably from about 26% to about 28% by weight of the product at this stage.

The amount of edible starch powder applied to the rice grains in either embodiment of the process is preferably from about 5% to about 25% by weight of the raw rice employed and most preferably from about 10% to about 20% of the weight thereof.

The final stage in either embodiment of the process may be carried out by passing a stream of air or of an inert gas over and/or through the treated grains for a period of from about 2 to about 6 minutes at from about 90° C. to about 130° C., the longer times being employed at the lower temperatures: the preferred temperature range is from about 110° C. to about 120° C. The heating may be effected by placing the treated grains of increased moisture content in a shallow bed formed upon a conveyor belt, which belt is permeable by gas. The conveyor belt traverses a zone in which heated air or inert gas is blown upwardly through the conveyor belt and through the shallow bed of grains and then through a second zone in which heated air or inert gas is blown downwardly through the bed of grains and through the conveyor belt. Other methods of heating such as dielectric heating and infra-red heating may also be employed.

It is preferred to reduce the moisture content of the coated rice grains to from about 10% to about 14% by weight, which is substantially the normal moisture content of milled rice grains.

Before passing to storage or being packed it is desirable that the temperature of the thus treated rice grains be reduced to room temperature. Therefore, when using a conveyor belt upon which to carry out the heat treatment as described above the conveyor belt may traverse a third zone in which air or inert gas at room temperature is blown downwardly through the grains until they have substantially attained room temperature. Thereafter the grains may be passed to packing or storage.

It will be obvious to those skilled in the art that the present invention may be carried out either batch-wise or continuously. In batch operation heating may take place upon trays of suitable mesh size to retain the rice particles, air or inert gas being passed through the grains in essentially the manner already described. Alternatively, heated air or inert gas may be passed over a layer of grains, means being provided for moving the grains upon the trays relative to one another until they are substantially uniformly dry and of the desired moisture content, whereupon gas or air at room temperature is passed over the grains until they have cooled.

The following examples illustrate the nature of the present invention without, however, limiting the same thereto.

EXAMPLE 1

2400 gm. of rice grains were soaked in water at 55° C. for 10 minutes, excess water drained away and the rice then tempered in an enclosed vessel for 1 hour at room temperature. The moisture content was 25% by weight.

A maize starch mucilage was prepared by dissolving 30 grams of maize starch in 970 ccs. of water and heating until gelatinization occurred.

The tempered rice was placed in a horizontally disposed cylindrical mixing drum which was rotated while 250 grams of the maize starch mucilage and 400 grams of maize starch containing a small quantity of edible caramel coloring matter was introduced at the respective rates of 40 ccs. per minute and 65 gms. per minute. The resulting coated rice grains were then heated, first by the upward passage of a current of hot air at 115° C. for 2.25 minutes and then by the downward passage of a similar current of hot air for 2.25 minutes. This treatment resulted in a rapid expulsion of moisture from the coated rice grains.

EXAMPLE 2

Example 1 was repeated with the addition of 14 gms. of a commercial nutmeg flavoring to the maize starch. A nutmeg flavored product was obtained.

EXAMPLE 3

Example 1 was repeated using, in place of the 250 grams of maize starch mucilage, 280 grams of a 1% gum tragacanth mucilage. A similar product was obtained.

EXAMPLE 4

2200 grams of raw rice (moisture content 11.2% by weight) were washed in water for 20 seconds and then centrifuged: the moisture content of the centrifuged product was 14.0% by weight.

A maize starch mucilage was prepared by dissolving 15 grams of maize starch and a small quantity of caramel coloring in 985 ccs. of water and heating until gelatinization occurred. 420 grams of powdered maize starch were slurried with 425 grams of the thus prepared starch mucilage.

The rice was placed in a horizontally disposed cylindrical mixing drum which was rotated. The maize starch slurry in starch mucilage was then sprayed on to the rice during 13 minutes while tumbling the rice. This produced a product containing 24% by weight of moisture.

After conditioning in an enclosed space for 45 minutes the tempered, coated rice grains were heated in a current of hot air in the manner described in Example 1 in order rapidly to expel moisture therefrom.

EXAMPLE 5

Example 4 was repeated using, in place of the slurry described therein, a slurry prepared by dissolving 2.5 grams of maize starch, and a small amount of edible caramel coloring matter in 497.5 ccs. of water, heating to gelatinize, cooling to below 60° F., then slurrying in 400 grams of maize starch and 14 grams of a commercial nutmeg flavor. A nutmeg flavored product was produced.

To prepare a rice pudding from a product of the present invention it is only necessary to take about 2 ozs. of the coated rice product, to add one pint of milk and sugar to taste and, having mixed the whole, to boil for 10 minutes. The product is then removed from the heat, allowed to stand for a few minutes, e.g., for 10 minutes, and it is then ready to serve.

What is claimed is:

1. In a process for the production of a modified rice in the form of grains which comprises contacting milled rice grains with water at a temperature below the gelatinization point of the starch in said grains for a period of 10–30 minutes to raise the moisture content uniformly-throughout said grains to about 18 to 30% by weight and heating said rice grains at a temperature of 90°–120° C. while avoiding gelatinization of said rice to cause a rapid expulsion of moisture and a reduction in the moisture content of the grains to about 10–14% by weight, the improvement comprising coating the rice grains prior to the expulsion of moisture with a composition comprising an edible mucilage and about 5–25% edible starch based on the weight of the rice.

2. A process according to claim 1 wherein the edible mucilage is selected from the group consisting of gelatinized starch, watch soluble dextrins, water soluble cellulose derivatives, plant mucilage, and seaweed mucilage.

3. A process according to claim 1 wherein the rice grains are coated with the starch-edible mucilage composition prior to raising the moisture content of the grains.

4. A process according to claim 1 wherein the rice starch-edible mucilage composition is admixed to the water used to moisten the rice grains.

5. A process according to claim 1 wherein the rice grains are coated with the starch-edible mucilage composition after the moisture content of the rice grains has been raised to about 18–30% by weight.

6. A process according to claim 1 wherein the edible mucilage and starch are simultaneously coated on the rice grains.

7. A process according to claim 1 wherein the edible mucilage and the starch are coated sequentially on the rice grains.

8. A process according to claim 1 wherein excess surface water is removed from said rice grains prior to the expulsion of the moisture.

9. A process according to claim 1 wherein the moistened rice grains are tempered for about 10 minutes to about four hours at a temperature of about 20–55° C., thereby uniformly distributing the moisture throughout the rice.

10. A process according to claim 1 wherein the starch is present in the amount of 10–20% based on the weight of the rice.

11. A rapidly hydratable rice composition suitable for preparing rice pudding, comprised of fissured, substantially ungelatinized rice having a moisture content of about 10–14% by weight and a coating comprised of an edible mucilage and about 5–25% edible starch based on the weight of rice.

References Cited
UNITED STATES PATENTS

| | | | |
|---|---|---|---|
| 2,278,465 | 4/1942 | Musher | 99—83 |
| 2,508,477 | 5/1950 | Stievater et al. | 99—11 |
| 2,712,499 | 7/1955 | La Pierre | 99—38 X |
| 2,868,647 | 1/1959 | Vollink | 99—8 |
| 2,890,118 | 6/1959 | Cantor et al. | 99—83 |
| 3,157,514 | 11/1964 | Gorozpe | 99—80 |
| 3,164,475 | 1/1965 | Willock | 99—80 |

RAYMOND N. JONES, *Primary Examiner.*